United States Patent [19]
Beemer et al.

[11] Patent Number: 6,027,293
[45] Date of Patent: Feb. 22, 2000

[54] NUT RETAINING PLATE

[75] Inventors: Andrew Paul Beemer, Omaha, Nebr.; Patrick Leonard Windschitl, Durango, Iowa; Chris Allen Cline; Daniel Dean Radke, both of Dubuque, Iowa

[73] Assignee: Deere & Company, Moline, Ill.

[21] Appl. No.: 09/232,426

[22] Filed: Jan. 15, 1999

[51] Int. Cl.[7] .............................. F16B 39/10; F16B 43/00
[52] U.S. Cl. ...................... 411/119; 411/112; 411/971; 411/999
[58] Field of Search ........................ 411/111, 112, 113, 411/119, 120, 121, 971, 999

[56] References Cited

U.S. PATENT DOCUMENTS

| | | | |
|---|---|---|---|
| 149,363 | 4/1874 | Wingate | 411/119 |
| D. 317,712 | 6/1991 | Jones | D8/399 |
| 878,258 | 2/1908 | Volk | 411/120 |
| 1,168,860 | 1/1916 | Corotto et al. | 411/119 X |
| 3,695,324 | 10/1972 | Gulistan. | |
| 4,488,844 | 12/1984 | Baubles | 411/85 |
| 4,830,557 | 5/1989 | Harris et al. | 411/112 X |
| 4,906,150 | 3/1990 | Bennett | 411/119 |
| 5,326,206 | 7/1994 | Moore | 411/113 |

*Primary Examiner*—Neill Wilson

[57] ABSTRACT

A fastener assembly is adapted for attaching an article to a workpiece having a slot. The fastener assembly includes a flanged nut which has internal threads and a non-circular cross-section, and a bolt having a threaded shank for engagement with the internal threads of the nut. The fastener assembly also includes a plate which comprises a main body and a tab portion extending from the main body. The plate has an opening complementary to the non-circular cross-section of the nut for receiving the nut therein and for securing the nut against rotation relative to the plate when the nut is placed in the opening. Alternatively, a nut is fixed to an underside of the plate against rotation and the opening in the plate is adapted for receiving the bolt therethrough. The tab portion of the plate extends into the slot in the workpiece for retaining the plate and nut and allowing limited float of the plate and nut with respect to the workpiece.

11 Claims, 1 Drawing Sheet

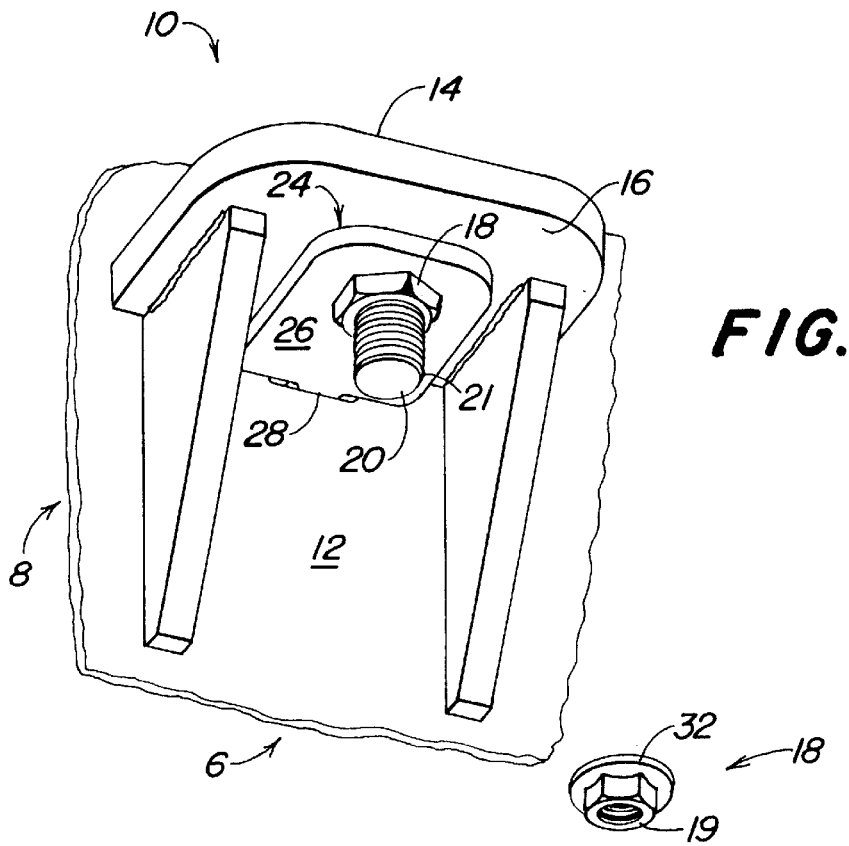
FIG. 1
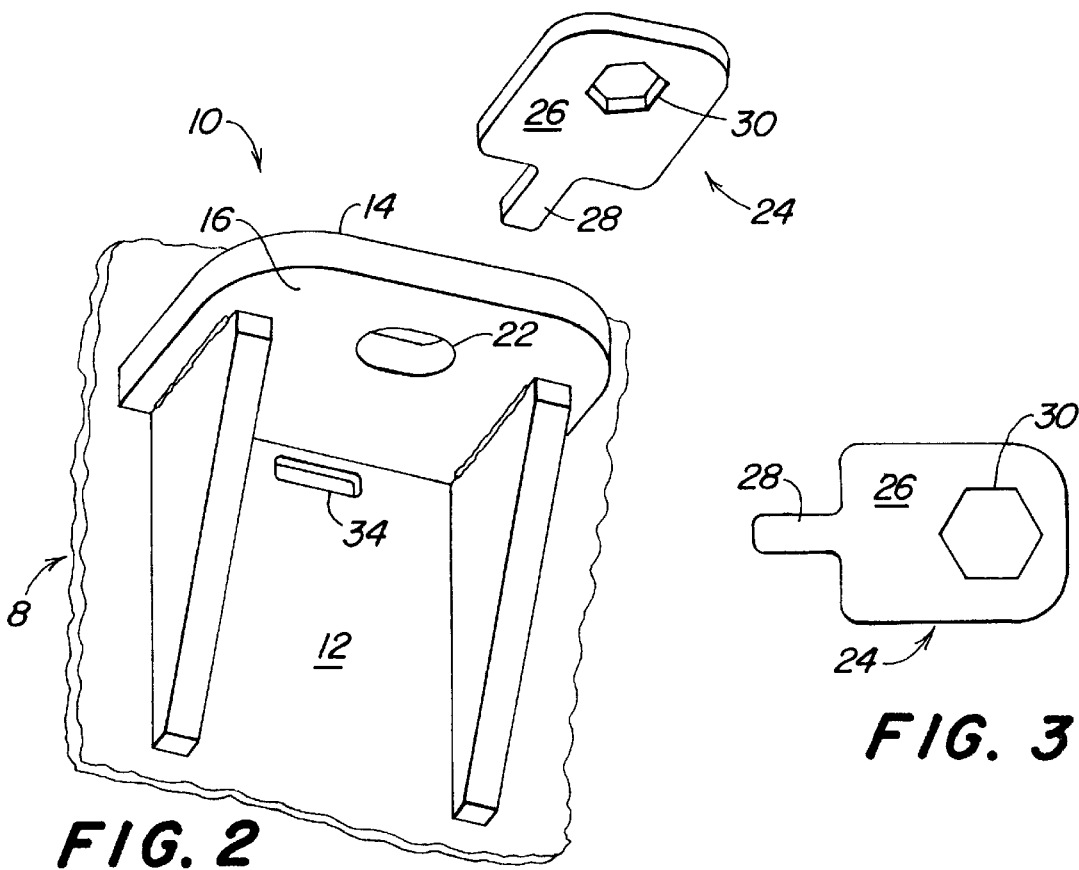
FIG. 2
FIG. 3

NUT RETAINING PLATE

BACKGROUND OF THE INVENTION

1. Field of the Invention

The present invention relates to fasteners for assembly situations which otherwise do ot allow straightforward use of standard tools and assembly methods. More specifically, the present invention relates to apparatus for use in such a situation for holding a nut in position for assembly of a part to a workpiece where a degree of fastener float is desired.

2. Description of Related Art

Manufacturers use various methods for securing a plurality of members together in blind, semi-blind, or otherwise awkward assembly situations which do not permit a simple fastening with a nut, bolt and standard tools. For example, where access to one side of a workpiece is restricted, it may be difficult or impossible for an assembler to engage a nut on that side of the workpiece with a standard wrench or socket while simultaneously engaging the head of a bolt on the other side. Various methods have been employed to overcome this problem. For instance, a nut may be welded to one side of the workpiece so that it is unnecessary to engage the nut with a tool during assembly. However, making use of such a welded nut may prove difficult because the weldment makes no allowance for tolerances as the nut is immovable with respect to the workpiece.

Another conventional solution utilizes a cage nut, wherein a nut is retained in a cage, the cage being fixed to the workpiece. The cage allows the nut some freedom of movement with respect to the workpiece, but can be designed to limit the range of movement. The cage nut functions adequately, but the fabrication of the cage and its attachment to the workpiece represent increased cost.

An alternative way commonly used to overcome blind or awkward assembly situations involves design and employment of specialized installation and removal tools which provide access to the desired area of attachment. For instance, a wrench may be designed with a shaft bent in numerous places at desired angles, allowing an assembler to achieve simultaneous engagement of a nut and bolt. However, these specialized tools must be used every time the bolt is ever removed and reinstalled. Therefore, anyone wishing to remove the article from the workpiece must have access to the specialized tools, as the operation will likely be difficult or impossible to accomplish with standard tools.

A further known solution involves the use of conventional floating nut plates. Nut plates have been used extensively on panels and other parts, providing a means for holding a nut to the part so that it is available, while also allowing for limited floating movement of the nut so that it can be more easily engaged by a bolt. Such a fastening device typically includes a receptacle which is provided by a flat plate from which portions are bent to engage and retain flanges projecting from the nut. This holds the nut to the receptacle, while allowing movement of the nut.

The receptacle ordinarily includes an extension on either side of the nut, each having an opening for the purpose of receiving separate fasteners used in securing the receptacle to the workpiece. Normally, a rivet is received in each of these openings to provide a means for attachment. Therefore, to install the assembly on a workpiece, it is necessary to drill three accurately spaced openings through the workpiece. Two of these are for the rivets used in securing the receptacle to the workpiece. Between them is a larger opening through which the threaded shank of a bolt may pass for engaging the nut. In addition to drilling the three holes, it is then necessary to extend the rivets through the outer openings and upset them to complete the fastening sequence. This is a time-consuming and relatively expensive operation. Furthermore, the need for the extra openings for the rivets in some instances can undesirably weaken the part to which the assembly is to be attached. Removal of the assembly also takes time in requiring removal of the two rivets to permit the unit to be separated from the workpiece. The necessity of dimensioning the receptacle so as to include the two rivet holes causes it to be relatively long, so that it may not be possible to fit the assembly at corners and certain locations where spacing is limited. Special receptacle designs then are required, and these are a great deal more expensive than those of conventional construction. Inventory costs are increased by the necessity to stock different versions of the nut plate so that those having special receptacles are available as needed.

U.S. Pat. No. 3,695,324, the disclosure of which is hereby incorporated by reference, shows a floating nut assembly including a basket having upwardly extending sidewalls with slots in them which receive tabs projecting from a sleeve member having a tubular section extending through a central opening in the basket member. The nut also has tabs projecting through the slots in the sidewalls of the basket member. The assembly dimensioned so that while the tabs hold the nut to the basket member the nut is permitted to have limited floating movement. Attachment of the assembly to the workpiece is accomplished by extending the tubular section through a single opening in the workpiece. A straight knurl is provided on the tubular portion and becomes embedded in the periphery of the opening in the workpiece, which thereby prevents rotation of the assembly.

Although the floating nut assembly described in U.S. Pat. No. 3,695,324 represents a decrease in time and cost required to mount the assembly to the workpiece as compared to other conventional designs, the assembly itself is rather complex and requires multiple specially designed components, which translates to additional expense.

SUMMARY OF THE INVENTION

An object of this invention is to provide a floating nut assembly that is easily and quickly installed on a workpiece.

Another object of this invention is to provide a floating nut assembly that is compact and allows one designed to be used in a wide variety of applications/situations.

A further object of this invention is to provide a floating nut assembly avoiding the use of auxiliary fastening devices to secure the assembly to a workpiece.

An additional object of this invention is to provide a floating nut assembly that is readily removable from a workpiece, and which allows the nut to be removed from the receptacle and replaced.

Yet another object of this invention is to provide a floating nut assembly that is of simple, lightweight construction and is inexpensive to manufacture.

These and other objects are achieved by the present invention wherein an assembly includes a nut retainer which may be easily and inexpensively fabricated, while easily coupled to the workpiece and permitting limited floating of a nut.

The nut retainer of the present invention comprises a plate having the following two features: first, an opening in the plate (for example, a hexagonal bore into which a standard flanged nut may be positioned), and second, a tab projecting outwardly from the plate. The location and geometry of the tab as well as the remaining features of the plate may be varied to accommodate diverse assembly conditions.

The nut retaining plate holds a nut during assembly when holding the nut would otherwise be awkward or impossible. The plate provides the nut with lateral movement capacity to accommodate assembly tolerances and to allow installation in an area restricting access to normal tools. No permanent attachment of the plate to the workpiece (such as by rivets) is required.

An illustrative embodiment of the present invention includes a nut retainer configured as a flat, cut plate, a standard flanged nut (hexagonal in plan excepting the flanged portion), and an installation slot in the workpiece. All pieces fit together loosely, with the flanged nut fitting into a hexagonal opening cut in the flat plate, and a tab jutting from the flat plate fitting into the slot in the workpiece structure such that gravity and/or friction holds the nut in position until assembly. Upon assembly, part fit and the use of a slot results in a high degree of fastener float. The slot confines the tab portion of the retainer and the surface of the hexagonal nut bears against sides of the complementary hexagonal opening. These factors combine to prevent the nut from turning substantially. After assembly, the nut retainer remains captured against the workpiece.

Alternatively, the nut may be welded or otherwise permanently fixed by another means to the underside of the plate. In such a case, the desirability of an opening in the plate complementary to the cross section of the nut is obviated and the need for a flanged portion of the nut may also be obviated.

Only one manufactured part is required for this installation. No permanent attachment of the retainer to the workpiece is required prior to assembly. In at least one illustrative embodiment, no subassembly is required prior to use of the invention. If the nut is stripped or otherwise damaged, it can be replaced easily by another standard flanged nut (or another retainer plate having a nut fixed thereto) using standard tools.

BRIEF DESCRIPTION OF THE DRAWINGS

FIG. 1 perspective view of a fastening assembly including a nut retainer according to the present invention for use in installing an article on a workpiece comprising a mounting bracket secured to a main frame;

FIG. 2 is an exploded view of the fastening assembly of FIG. 1; and

FIG. 3 is a plan view of the nut retainer of FIGS. 1 and 2.

DESCRIPTION OF THE ILLUSTRATIVE EMBODIMENT

A fastening assembly 6 according to the present invention is shown in FIG. 1. A workpiece 8 comprises a mounting bracket 10 secured to a main frame 12. The mounting bracket 10 has upper and lower surfaces 14, 16, wherein an article such as an engine (not shown) may be secured to the main frame 12 by placing the article on the upper surface 14 of the mounting bracket 10 and securing the article with a nut 18 and a bolt 20 wherein a threaded shank 21 of the bolt 20 is directed downwardly through an opening 22 (FIG. 2) in the mounting bracket 10 and into engagement with internal threads 19 (FIG. 2) of the nut 18, drawing the nut 18 upward against the lower surface 16 of the mounting bracket 10 to secure the article to the workpiece 8.

To accomplish the engagement of the bolt 20 with the nut 18 during assembly, a nut retainer 24 is used to hold the nut 18 in position below the lower surface 16 of the mounting bracket 10. The nut retainer 24 of the present invention as illustrated in FIGS. 1–3 comprises a plate having a main body 26 which is configured as a generally planar surface which is rectangular in plan, and a tab portion 28 which extends therefrom. The nut 18 is a standard flanged nut 18 with a hexagonal cross section and a flanged portion 32 (shown in FIG. 2). The main body 26 of the retainer 24 has an opening 30 into which the nut 18 is inserted. In this case, the opening 30 is hexagonal to complement the hexagonal shape of the nut 18 so that the nut is prevented from rotating within the opening 30. The nut 18 is prevented from passing through the opening 30 by a flanged portion 32 of the nut 18 which rests on the main body 26 of the retainer 24 adjacent to the opening 30. Alternatively, a nut may be fixed to the underside of the retainer, in which case the opening need not complement the shape of the nut but may instead be made circular to allow passage therethrough of a bolt which will engage the nut after passing through the opening in the retainer.

Referring now to FIG. 2, an installation slot 34 is cut into the main frame 12 to receive the tab portion 28 of the nut retainer 24. The extension of the tab portion into the installation slot 34, captures the nut retainer 24 (and its associated nut 18). The slot 34 is marginally larger than the tab portion 28 of the retainer 24, allowing limited floating movement while preventing substantial rotation of the nut 18. The tab portion 28 secures the retainer 24 to the workpiece 8 to the extent that it will not be disengaged from the workpiece 8 by the effect of gravity or by relatively moderate movement of the workpiece 8. This result may be obtained, for example, by using a retainer 24 having a tab portion 28 which is 6 mm thick and 10 mm wide, which is captured in a slot 34 which is 6.5 mm high and 25 mm wide.

The opening 22 may be made round if necessary to prevent movement of article after the nut 18 and bolt 20 are tightened, or the opening 22 may be made oblong as shown in FIG. 2 to allow additional freedom in adjusting the position of the bolt 20 during assembly to engage floating nut 18. If the article is secured to the workpiece in four locations, for example, at two front and two rear mounting brackets, openings on the front brackets may be elongated along a first axis (e.g. laterally) while openings on the rear brackets are elongated along an axis offset 90 degrees from the first axis (e.g., longitudinally), allowing additional freedom during assembly while helping to prevent the article from moving in either direction when mounted on the workpiece 8.

Upon assembly, part fit and the use of a slot results in a high degree of fastener float. The tab portion 28 positioned within the slot 34 and the hexagonal opening 30 to complement the hexagonal cross section of the nut 18 prevent the nut 18 from turning. After assembly, the retainer 24 remains captured against the workpiece 8. If it becomes necessary to remove the article or to replace the nut 18 or bolt 20, the fastening assembly 6 may be easily disassembled and reassembled using the same nut retainer 24 and standard tools. If a nut is fixed to the underside of a retainer according to an alternative embodiment, the fastening assembly may be easily disassembled using standard tools and the nut may be replaced, if necessary, by another nut fixed to the same or a replacement retainer.

Although the invention is described with reference to an illustrative embodiment for use with an mounting bracket having upper and lower surfaces which are generally planar, it will be understood by those skilled in the art that the invention may be advantageous in the form describes as its preferred embodiment or as modified for use in other applications wherein it is desirable to secure a nut while allowing limited floating movement for ease of assembly.

The present invention should not be limited by the above-described embodiments, but should be limited solely by the claims that follow.

We claim:

1. A fastening assembly for attaching an article to a workpiece having a slot, said assembly comprising:

a flanged nut having internal threads and a non-circular cross-section;

a bolt having a threaded shank adapted for engagement with the internal threads of the nut;

a nut retaining plate comprising a main body and a tab portion extending from the main body;

said plate having an opening complementary to the non-circular cross-section of the nut for receiving the nut therein and securing the nut against rotation relative to the plate when the nut is placed in the opening;

said tab portion of the plate extending into the slot in the workpiece for retaining the plate and nut and allowing limited float of the plate and nut with respect to the workpiece; and said flanged nut presenting a substantially flat face adiacent the workpiece.

2. The fastening assembly of claim 1 wherein the cross-section of the nut and the opening in the plate are each hexagonal.

3. The fastening assembly of claim 1 additionally comprising a bolt in threaded engagement with the nut and wherein the workpiece has an opening through which bolt extends.

4. The fastening assembly of claim 3 wherein the opening is configured as an elongated slot.

5. The fastening assembly of claim 3 wherein the workpiece comprises main frame and an mounting bracket secured to the main frame.

6. A nut retaining plate for holding a nut to secure an article to a workpiece with a bolt and a flanged nut presenting a substantially flat face adjacent the workpiece, said flat face oriented substantially normal to the bolt axis, said nut retainer comprising:

a generally planar section having an opening for receiving the nut; and a tab section extending from an end of the generally planar section and adapted for engagement with a complementary slot in the workpiece.

7. The nut retaining plate of claim 6 wherein the generally planar section is generally rectangular in plan.

8. The nut retaining plate of claim 6 wherein the tab section is smaller than the generally planar section.

9. A nut retaining plate for holding a nut to secure an article object to a workpiece with a bolt and a nut, said nut retainer comprising:

a generally planar section having an opening for receiving the bolt and having an underside, said nut fixed to the underside of the planar section against relative rotation and in alignment with the opening;

a tab section extending from an end of the generally planar section and adapted for engagement with a complementary slot in the workpiece; and said nut presenting a substantially flat face adjacent the workpiece.

10. The nut retaining plate of claim 9 wherein the generally planar section is generally rectangular in plan.

11. The nut retaining plate of claim 9 wherein the tab section is smaller than the generally planar section.

* * * * *